(12) United States Patent
Watanabe et al.

(10) Patent No.: US 9,425,446 B2
(45) Date of Patent: Aug. 23, 2016

(54) ASSEMBLED BATTERY

(71) Applicant: Lithium Energy Japan, Kyoto-shi (JP)

(72) Inventors: Minoru Watanabe, Ritto (JP); Yoshihiro Masuda, Ritto (JP); Yo Hasegawa, Ritto (JP)

(73) Assignee: GS YUASA INTERNATIONAL LTD., Kyoto-shi, Kyoto (JP)

( * ) Notice: Subject to any disclaimer, the term of this patent is extended or adjusted under 35 U.S.C. 154(b) by 0 days.

(21) Appl. No.: 14/034,655

(22) Filed: Sep. 24, 2013

(65) Prior Publication Data

US 2014/0087229 A1 Mar. 27, 2014

(30) Foreign Application Priority Data

Sep. 26, 2012 (JP) .................................. 2012-213277

(51) Int. Cl.
*H01M 2/18* (2006.01)
*H01M 2/10* (2006.01)
*H01M 2/02* (2006.01)
*H01M 2/04* (2006.01)

(52) U.S. Cl.
CPC .......... *H01M 2/1077* (2013.01); *H01M 2/0217* (2013.01); *H01M 2/043* (2013.01); *H01M 2/1033* (2013.01)

(58) Field of Classification Search
CPC .. H01M 2/1077; H01M 2/043; H01M 2/1033
See application file for complete search history.

(56) References Cited

U.S. PATENT DOCUMENTS

| 2005/0250006 | A1* | 11/2005 | Kim ........................ | H01M 2/18 429/160 |
| 2008/0286640 | A1* | 11/2008 | Naito ............................ | 429/100 |
| 2011/0059365 | A1* | 3/2011 | Meehan ................. | H01M 2/22 429/231.95 |
| 2011/0104547 | A1* | 5/2011 | Saito ................... | H01M 2/1077 429/120 |
| 2011/0293973 | A1 | 12/2011 | Kim | |

FOREIGN PATENT DOCUMENTS

| JP | 2005-150055 A | 6/2005 |
| JP | 2010-015760 A | 1/2010 |
| JP | 4638528 B2 | 2/2011 |
| JP | 2011-249309 A | 12/2011 |
| JP | 2012-128982 A | 7/2012 |
| WO | WO 2012/009090 A1 | 1/2012 |

OTHER PUBLICATIONS

Extended European Search Report dated Jan. 2, 2014.

* cited by examiner

*Primary Examiner* — Patrick Ryan
*Assistant Examiner* — Ben Lewis
(74) *Attorney, Agent, or Firm* — McGinn IP Law Group PLLC

(57) ABSTRACT

An assembled battery includes: a case in which plural electric cells are accommodated; and an abutment member which abuts against the electric cells accommodated in the case to position the electric cells with respect to the case. The abutment member includes a first projection inserted into a first gap defined by the case and the mutually adjacent electric cells to align the abutment member.

19 Claims, 13 Drawing Sheets

ASSEMBLED BATTERY

CROSS-REFERENCE TO RELATED APPLICATIONS

This application claims priority of Japanese Patent Application No.: 2012-213277 filed on Sep. 26, 2012, the content of which is incorporated herein by reference.

FIELD

The present invention relates to an assembled battery (battery module) including a plurality of electric cells (battery cells) electrically connected to each other so as to be modularized.

BACKGROUND

An assembled battery disclosed in each of JP 2012-128982 A (FIGS. 9 and 10) and JP 4638528 B1 (FIGS. 1 and 10) includes a case in which a plurality of electric cells are accommodated and an abutment member attached to an upper end opening of the case. The plurality of electric cells abuts against a lower side of the abutment member so as to be positioned in a height direction with respect to the case.

This kind of conventional assembled battery including those disclosed in JP 2012-128982 A and JP 4638528 B1 requires precise alignment of the abutment member with respect to the case and the electric cells accommodated in the case when the abutment member is attached to the case. The requirement for the precise alignment deteriorates operability of attaching operation of the abutment member. In case that the attaching operation of the abutment member is carried out by an automatic attaching apparatus, the automatic attaching apparatus is required to align the abutment member precisely.

However, in the conventional assembled battery including those disclosed in JP 2012-128982 A and JP 4638528 B1, enough consideration is not given to the attaching operability of the abutment member.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of the present invention to enhance attaching operability of an abutment member of the assembled battery including a plurality of electric cells accommodated therein.

An aspect of the present invention provides an assembled battery comprising, a case in which a plurality of electric cells are accommodated and an abutment member which abuts against the electric cells accommodated in the case to position the electric cells with respect to the case. The abutment member includes a first projection inserted into a first gap defined by the case and the mutually adjacent electric cells to align the abutment member.

BRIEF DESCRIPTION OF DRAWINGS

The foregoing and the other features of the present invention will become apparent from the following description and drawings of an illustrative embodiment of the invention in which.

DESCRIPTION OF EMBODIMENTS

Figure 1:
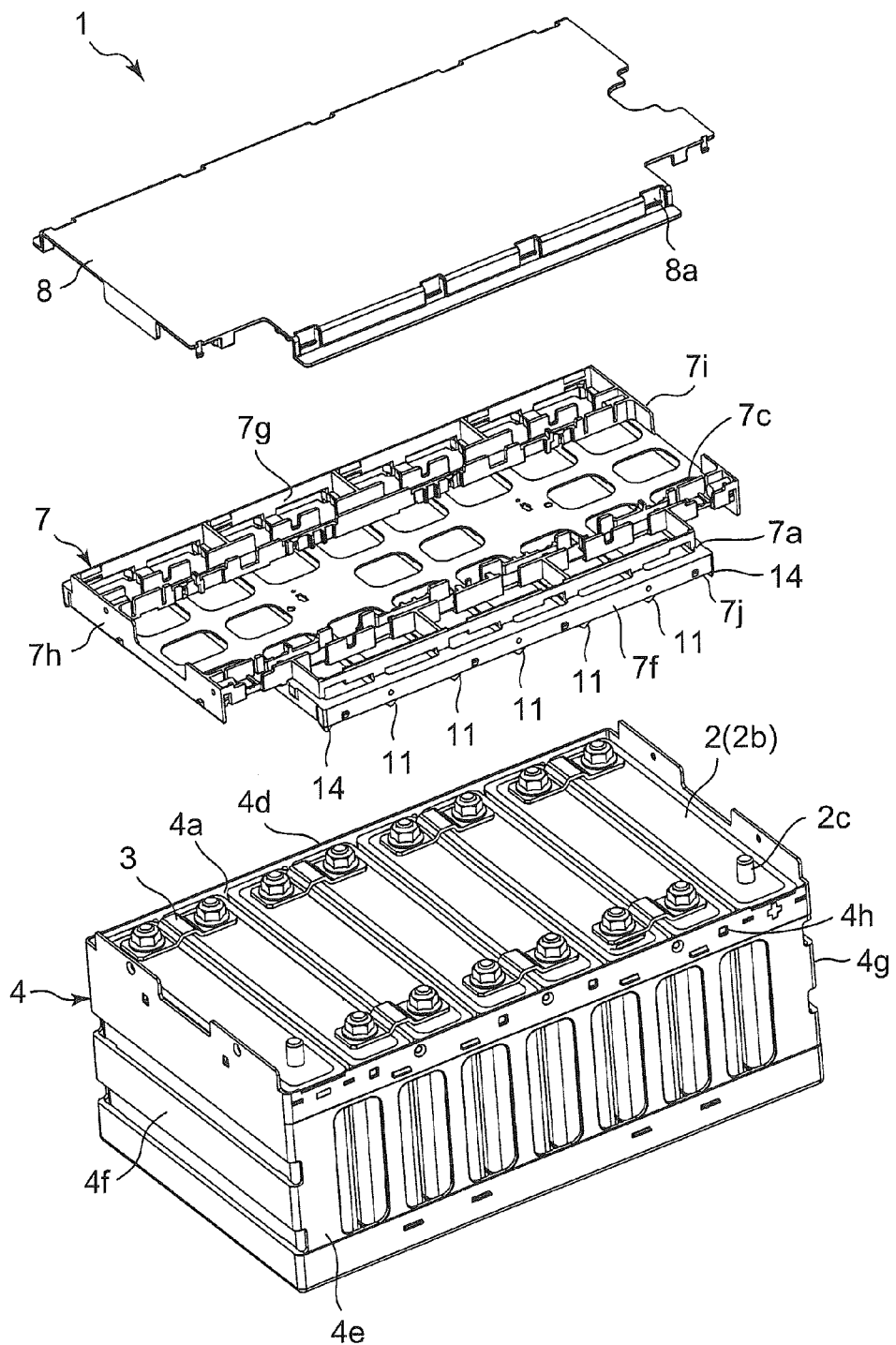
FIG. 1 is an exploded perspective view of an assembled battery according to an embodiment of the present invention.

An embodiment of the present invention provides an assembled battery comprising, a case in which a plurality of electric cells are accommodated and an abutment member which abuts against the electric cells accommodated in the case to position the electric cells with respect to the case. The abutment member includes a first projection inserted into a first gap defined by the case and the mutually adjacent electric cells to align the abutment member.

The abutment member is aligned by inserting the first projection into the first gap defined by the electric cells and the case. This enables attachment of the abutment member without precisely aligning thereof. In other words, since the first projection guides the abutment member to the aligned position, the attaching operability of the abutment member is enhanced.

It is preferable that the first projection is tapered from its proximal end toward its distal end. This achieves easy insertion of the first projection into the first gap, thereby further enhancing the attaching operability of the abutment member.

It is preferable that the abutment member includes a body which abuts against the electric cells and a rib which projects from the body so as to be inserted into the case, and that a length from the body to a distal end of the first projection is longer than a length from the body to a distal end of the rib. Since the distal end of the first projection projects more than the distal end of the rib, the first projection is reliably inserted into the first gap when the abutment member is attached.

It is preferable that a gap is provided between the first projection and the rib. When an external force is applied to the first projection due to interference between the first projection and the case or the electric cells at during the attaching operation of the abutment member, the gap allows the first projection itself to deform to some extent independently from the rib. Therefore, by providing the gap, it is possible to prevent the external force applied to the first projection from being transmitted to other portion of the abutment member through the rib.

Specifically, the case includes a sidewall which surrounds the plurality of electric cells. Further, the rib includes a main rib which projects from the body so as to be inserted between the electric cells and the sidewall. Furthermore, the first projection projects from a distal end of the main rib.

More specifically, the first projection includes a pair of first inclined surfaces, the distance between the first inclined surfaces in an arraying direction of the mutually adjacent electric cells being gradually reduced from the proximal end toward the distal end.

As the abutment member approaches the opening of the case, the pair of first inclined surfaces respectively comes into contact with the electric cells. The abutment member is guided by the contact of the first inclined surfaces with the corresponding electric cells so as to be aligned with respect to the opening.

It is preferable that as viewed from a direction in which the first projection is inserted, the electric cell is provided at its corner portion with an arc portion on a side of the sidewall and a straight portion connected to the arc portion and extending in a direction away from the sidewall. The proximal end of the first projection inserted into the first gap is located closer to the sidewall than a connected portion between the arc portion and the straight portion. By widely setting the maximum width of the first projection, i.e., a distance between the first inclined surfaces in the proximal end, the strength of the first projection can be enhanced. By locating the maximum width portion of the first projection at a position closer to the sidewall than the arc portion and the straight portion, it is unnecessary to excessively largely set a distance between mutually adjacent electric cells.

The rib may include a partition rib inserted between the mutually adjacent electric cells. In this case, it is preferable that the first projection is provided at a position of the main rib corresponding to an end of the partition rib. Further, in the case of this configuration, it is preferable that the first projection includes a second inclined surface which is provided on an extension line of the partition rib and gradually approaches the main rib from the proximal end toward the distal end. By providing the second inclined surface, the partition rib can is more smoothly inserted between mutually adjacent electrical cells. As a result, since the first projection is more smoothly inserted by the first gap, it is possible to more easily attach the abutment member to the opening of the case.

The case may include an angle portion formed on a connected portion between the two sidewalls. The abutment member may include a second projection tapered from its proximal end toward its distal end and inserted between a second gap defined by the angle portion and the electric cell so that the abutment member is aligned with respect to the opening of the case.

The abutment member is aligned by inserting the projection (first projection) provided on the abutment member into the gap (first gap) defined by the electric cells and the case. Therefore, it is possible to attach the abutment member without precisely aligning the abutment member. In other words, since the first projection guides the abutment member to the aligned position, the attaching operability of the abutment member is enhanced.

Figure 2:
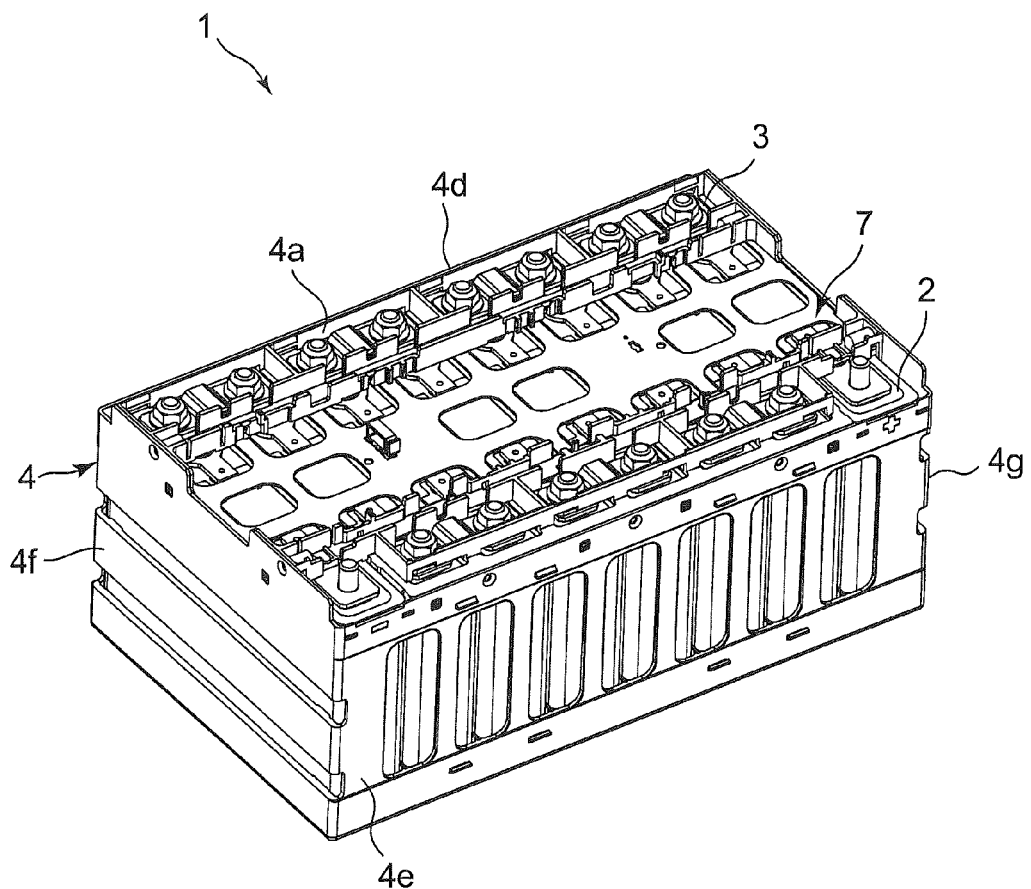
FIG. 2 is a perspective view of the assembled battery of the embodiment of the invention (a cover is not illustrated.)

FIGS. 1 and 2 show an assembled battery (battery module) 1 according to an embodiment of the present invention. The assembled battery 1 includes eight angle type electric cells (battery cells) 2 which are non-aqueous electrolyte secondary batteries. Each of the electric cells 2 includes a body 2a (having a flat rectangular parallelepiped shape in this embodiment) in which an electrode assembly and the like are accommodated, and a cover 2b which closes an upper end opening of the body 2a. A pair of terminals 2c projects from both ends of the cover 2b. The terminal 2c of each of the electric cells 2 is electrically connected to the terminal 2c of the adjacent electric cell 2 via a bus bar 3. In FIG. 1, the one of two terminals 2c of the electric cells 2 located on left and right ends respectively functions as a positive electrode and a negative electrode for the entire assembled battery 1.

Figure 3:
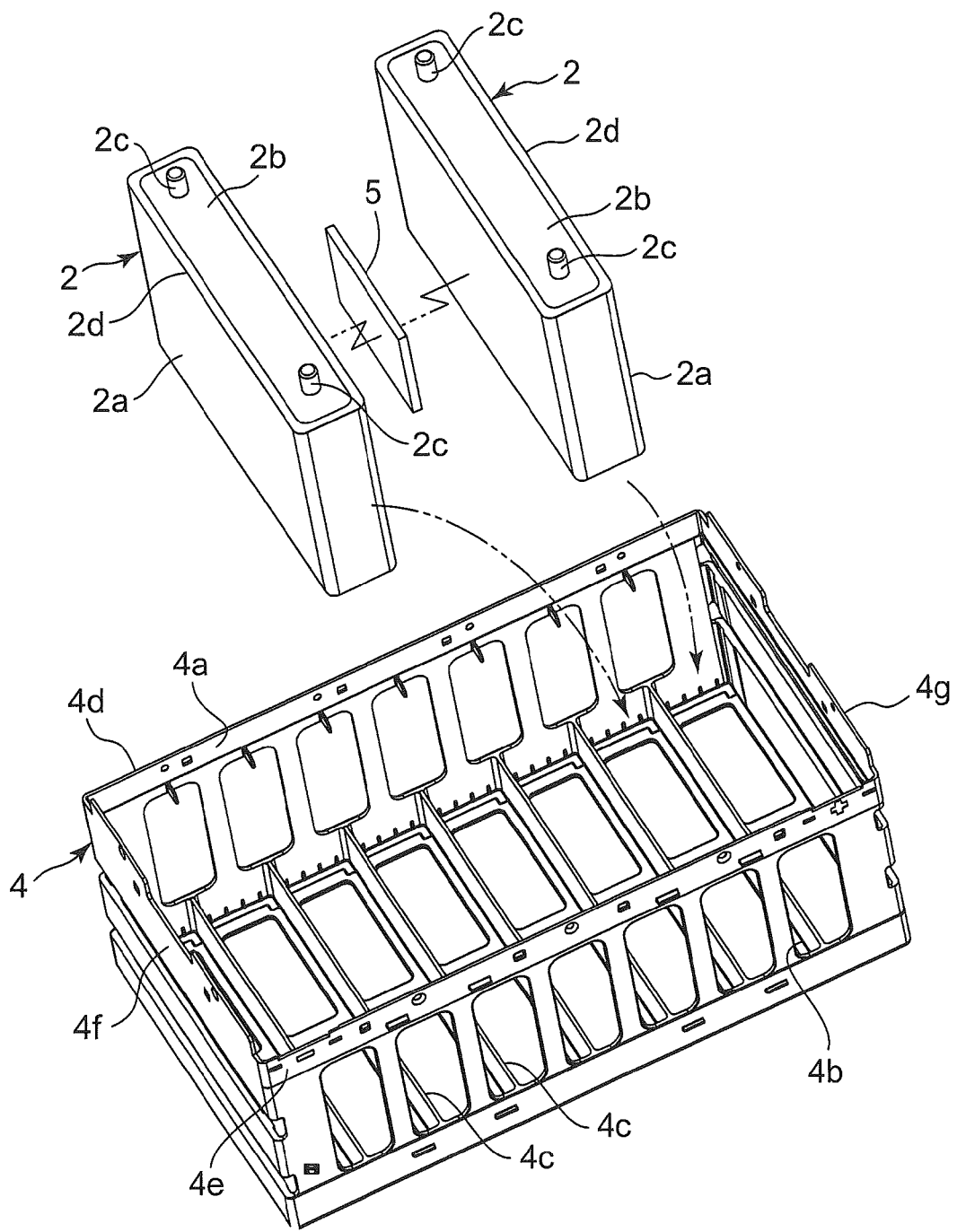
FIG. 3 is a perspective view of a case.

The electric cells 2 are accommodated in a case 4 made of resin in this embodiment. Referring also to FIG. 3, the case 4 is of a rectangular parallelepiped as a whole and has a box-shape including an upper end opening 4a. The electric cells 2 accommodated in the case 4 are arrayed in line so that their long sides as viewed from above are opposed to each other. A bottom wall 4b of the case 4 on which the electric cells 2 are placed is provided with a plurality of (seven in this embodiment) partition walls 4c which are inserted into bottoms of the mutually adjacent two electric cells 2. As shown in FIG. 3 in which only one pair of the electric cells 2 are depicted, a spacer 5 is interposed between the mutually adjacent electric cells 2.

The case 4 includes sidewalls 4d and 4e elongated in a long side direction. The sidewalls 4d and 4e upwardly extend from the bottom wall 4b. The sidewalls 4d and 4e are opposed to a pair of short sides of the respective arrayed electric cells 2 as viewed from above. The case 4 includes sidewalls 4f and 4g elongated in a short side direction. The sidewalls 4f and 4g upwardly extend from the bottom wall 4b. As viewed from above, the sidewalls 4f and 4g are opposed to the long sides of the two electric cells 2 located on both ends of the arrayed electric cells 2 (the electric cells 2 disposed on right and left ends in FIG. 1). The upper end opening 4a is defined by upper ends of the sidewalls 4d, 4e and the sidewalls 4f, 4g.

An abutment member (intermediate cover) 7 made of resin in this embodiment is attached to the upper end opening 4a of the case 4 accommodating the electric cells 2. A cover (outer cover) 8 made of metal in this embodiment is attached to the abutment member 7. Sidewalls of the cover 8 elongated in its long side direction are provided with a plurality of engaging pieces 8a. When the cover 8 is put on the abutment member 7 attached to the upper end opening 4a of the case 4, the engaging pieces 8a are engaged from inside of the sidewalls with engaging holes 7a provided in the abutment member 7, and thereby the abutment member 7 and the cover 8 are fixed with each other.

Figure 4:
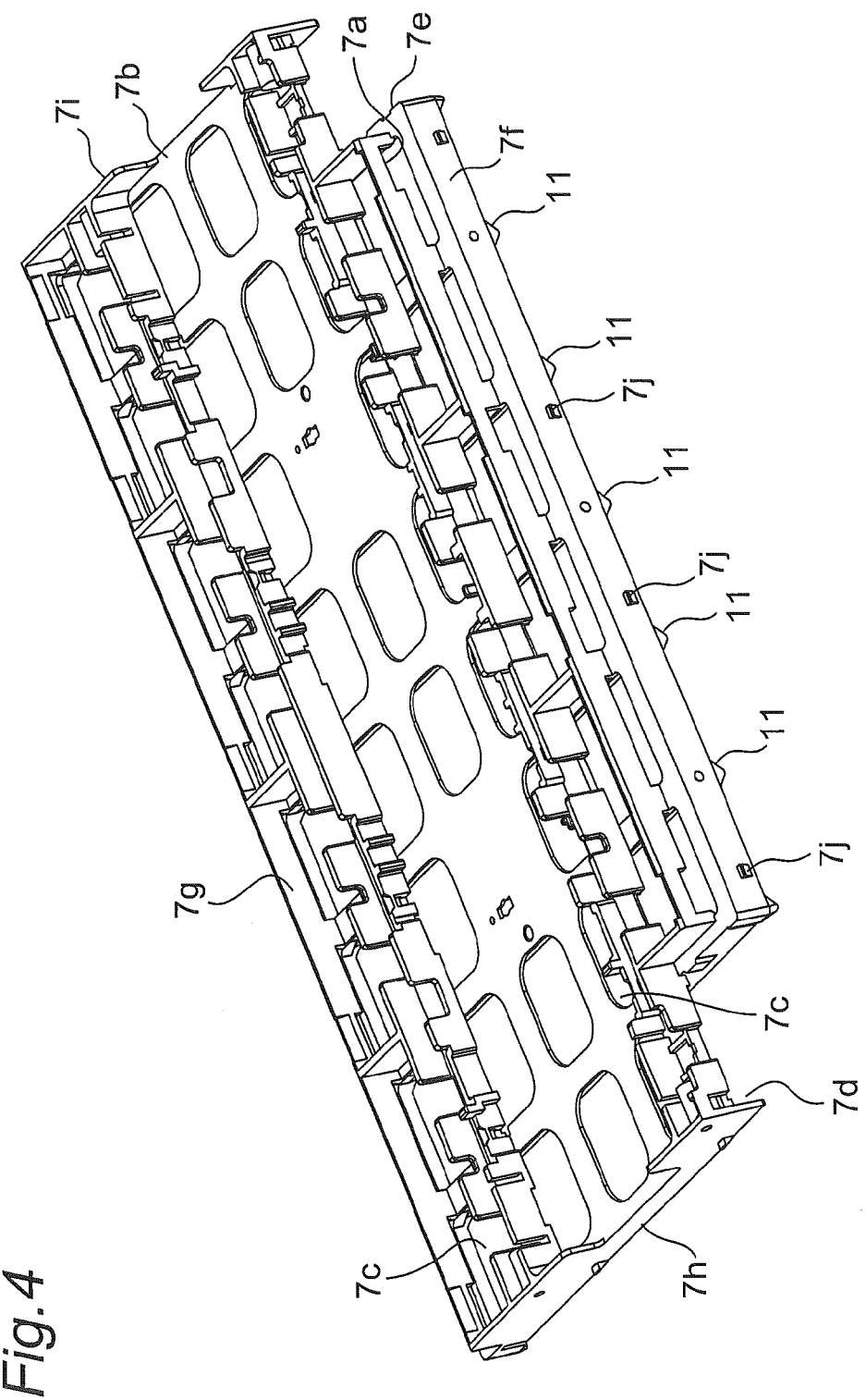
FIG. 4 is a perspective view of an abutment member as viewed from above.
Figure 5:
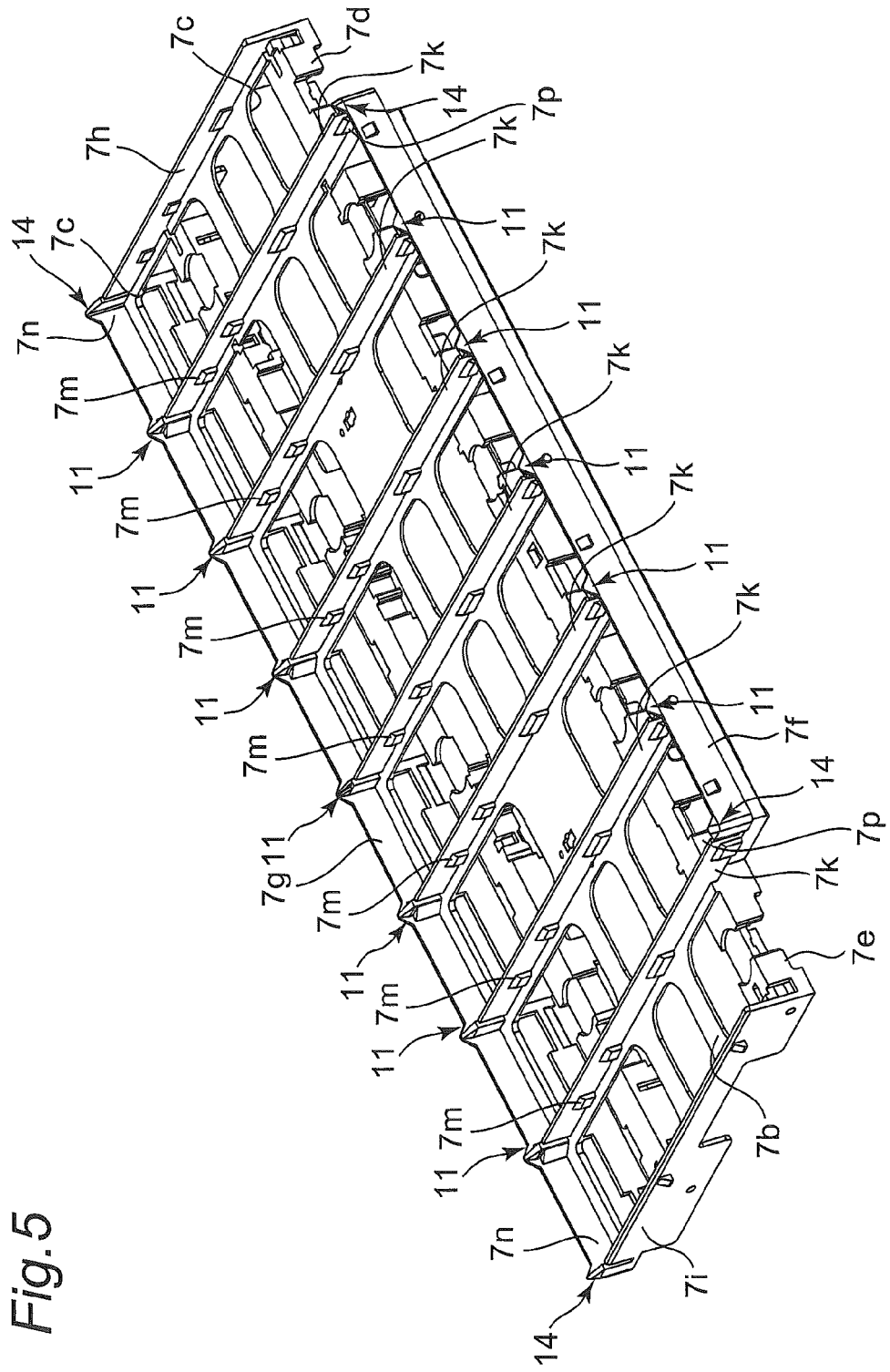
FIG. 5 is a perspective view of the abutment member as viewed from below.

Referring also to FIGS. 4 and 5, the abutment member 7 includes a body 7b of substantially rectangular configuration as a whole. In a state where the abutment member 7 is attached to the upper end opening 4a of the case 4, the body 7b abuts against top portions of the plurality of (eight in this embodiment) electric cells 2. Through holes 7c are formed in the body 7b. Terminals 2c of the electric cells 2 are respectively exposed from the through holes 7c. The body 7b is provided at its corners with notches 7d and 7e for exposing the above-described terminals 2c functioning as positive and negative electrodes for the entire assembled battery 1.

The abutment member 7 includes two pairs of flat plate-shaped main ribs 7f to 7i projecting downward from side edges of the body 7b. One pair of main ribs 7f and 7g elongated in the long side direction are inserted from above between the side walls 4d, 4e of the case 4 and pairs of short sides as viewed from above of respective electric cells 2 arrayed in line. The other pair of main ribs 7h and 7i elongated in the short side direction are inserted from above between the side walls 4f, 4g of the case 4 and the two electric cells 2 located on both ends of the arrayed electric cells 2 as viewed from above. The main ribs 7f to 7i are provided with a plurality of engaging projections 7j. When the cover 8 is attached to the upper end opening 4a of the case 4, insertion of the main ribs 7f to 7i between the case 4 and the electric cells 2 causes the engaging projections 7j to be fitted into engaging holes 4h formed in the sidewalls 4d to 4g of the case 4, and thereby the abutment member 7 and the case 4 are fixed with each other.

As shown in FIG. 5, a lower surface of the abutment member 7 is provided with a plurality of (seven in the embodiment) thin and long flat plate-shaped partition ribs 7k extending from the main rib 7f to the main rib 7g. Each of the partition ribs 7k is inserted from above between mutually adjacent two electric cells 2. Both surfaces of each of the partition ribs 7k are provided with a plurality of fixing ribs 7m which abut against sides of upper ends of the electric cells 2 when the partition ribs 7k are inserted between the electric cells 2.

As most clearly shown in FIG. 5, lower ends of the main ribs 7f and 7g of the abutment member 7 are provided with a plurality of first projections 11. Specifically, the first projections 11 are provided at positions where ends of the most left and right side two partition ribs 7k of the seven partition ribs 7k in FIG. 5 are connected the ends of the main rib 7g. Further, the first projection 11 are provided at positions where both ends of the remaining five partition ribs 7k are connected to the main ribs 7f and 7g. Thus, the first projections 11 are provided at positions of the main ribs 7f and 7g corresponding to the ends of the partition ribs 7k.

With reference to FIGS. 6 to 9, the first projections 11 project further downwardly from lower ends of the main ribs 7f and 7g. Specifically, a length from the body 7b of the abutment member 7 to a distal end of the first projection 11 is longer than a length from the body 7b to distal ends of the main ribs 7f and 7g and the partition ribs 7k. Each of the first projections 11 has a shape which is tapered from its upper end (proximal end) connected to the main ribs 7f and 7g toward its lower end (distal end). The first projection 11 is inserted from above into a first gap 12 defined by the upper ends of the mutually adjacent electric cells 2 and the sidewalls 4d and 4e of the case 4.

Figure 11:
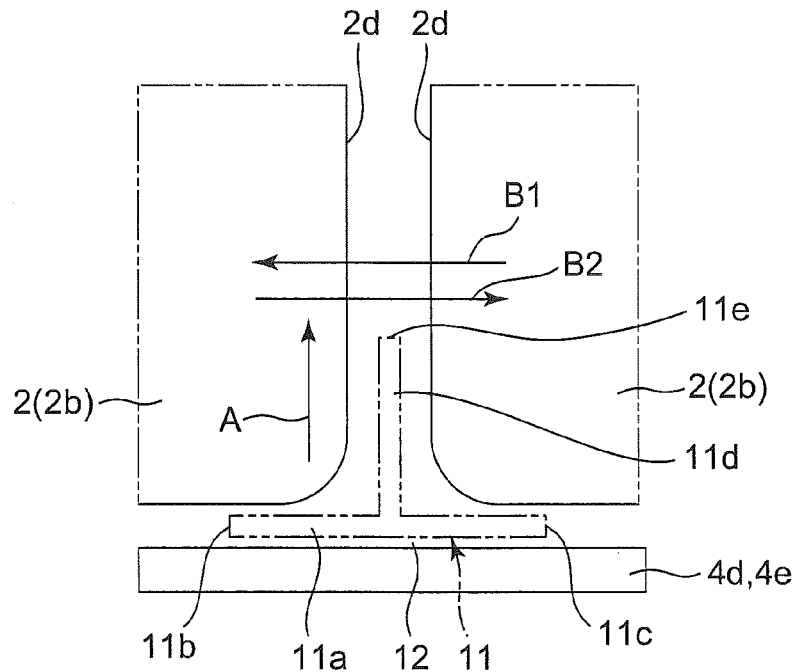
FIG. 11 is a schematic plan view of a first gap into which the first projection (without a pedestal) is inserted.

Each of the first projection 11 includes a first isosceles triangular plate portion 11a located substantially on the same plane with the main rib 7f or 7g. Both side surfaces of the first triangular plate portion 11a configure a pair of first inclined surfaces 11b and 11c. A distance between the first inclined surfaces 11b and 11c in an arrangement direction of the mutually adjacent electric cells 2 (see arrows B1 and B2 in FIG. 11) is gradually reduced from the upper end toward the lower end. As shown in FIG. 11, each of the first triangular plate portions 11a is inserted into a part of the first gap 12, i.e., a gap defined between the mutually adjacent electric cells 2 and the sidewall 4d or 4e of the case 4.

Each of the first projections 11 includes a second rectangular triangular plate portion 11d on the side of an inner surface of the first triangular plate portion 11a. One of two sides of the second triangular plate portion 11d forming a right angle extends along a symmetric line of the first triangular plate portion 11a. A hypotenuse of the second triangular plate portion 11d is provided on an extension line of the partition rib 7k and configures a second inclined surface 11e which gradually approaches the main ribs 7f and 7g from its upper end toward its lower end. As shown in FIG. 11, the second triangular plate portion 11d is inserted into other part of the first gap 12, i.e., a gap defined by the mutually adjacent electric cells 2.

Figure 6:
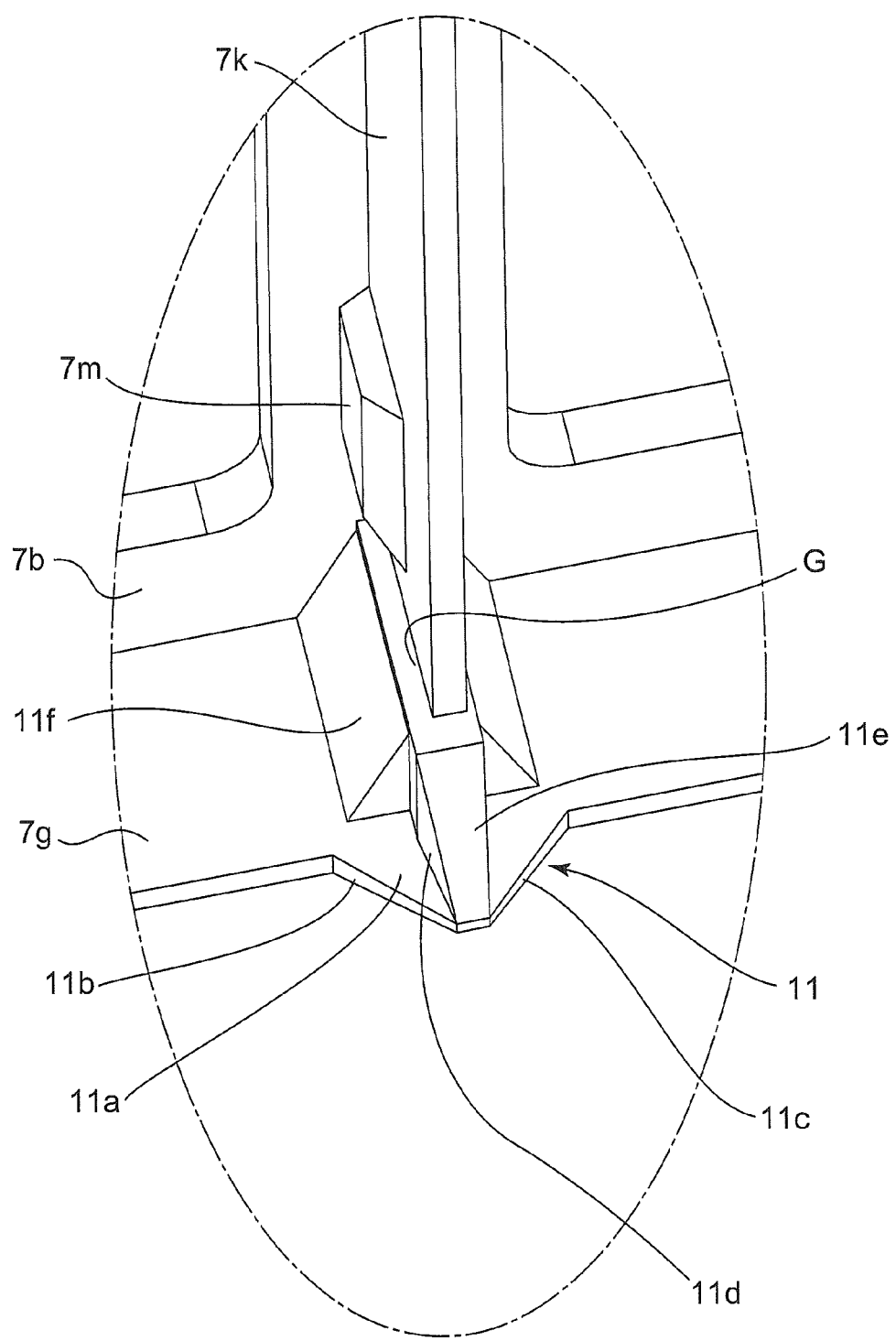
FIG. 6 is a perspective view of a first projection (with a pedestal) as viewed from below.
Figure 7:
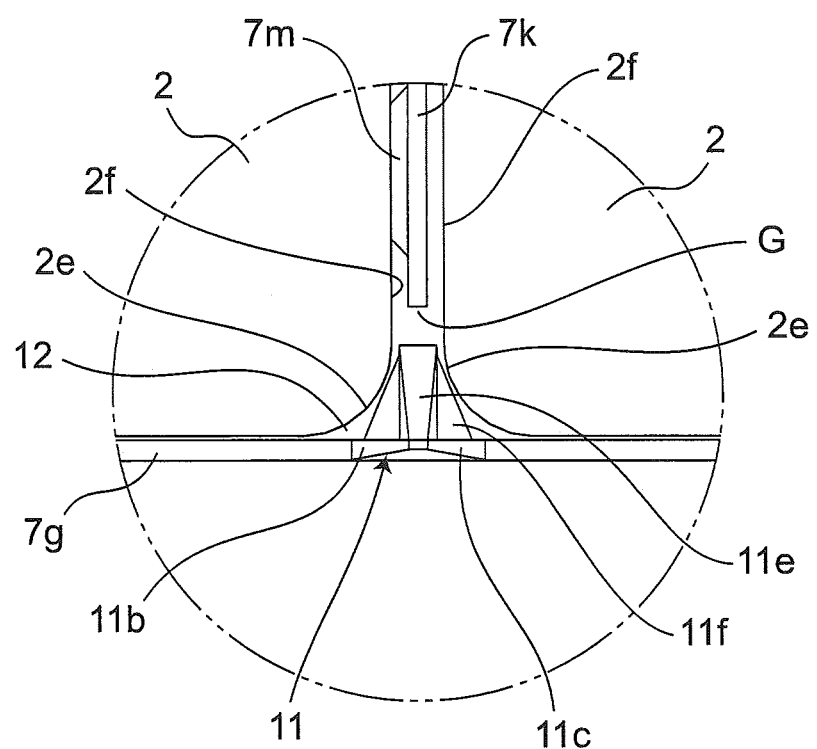
FIG. 7 is a bottom view of the first projection (with a pedestal)
Figure 8:
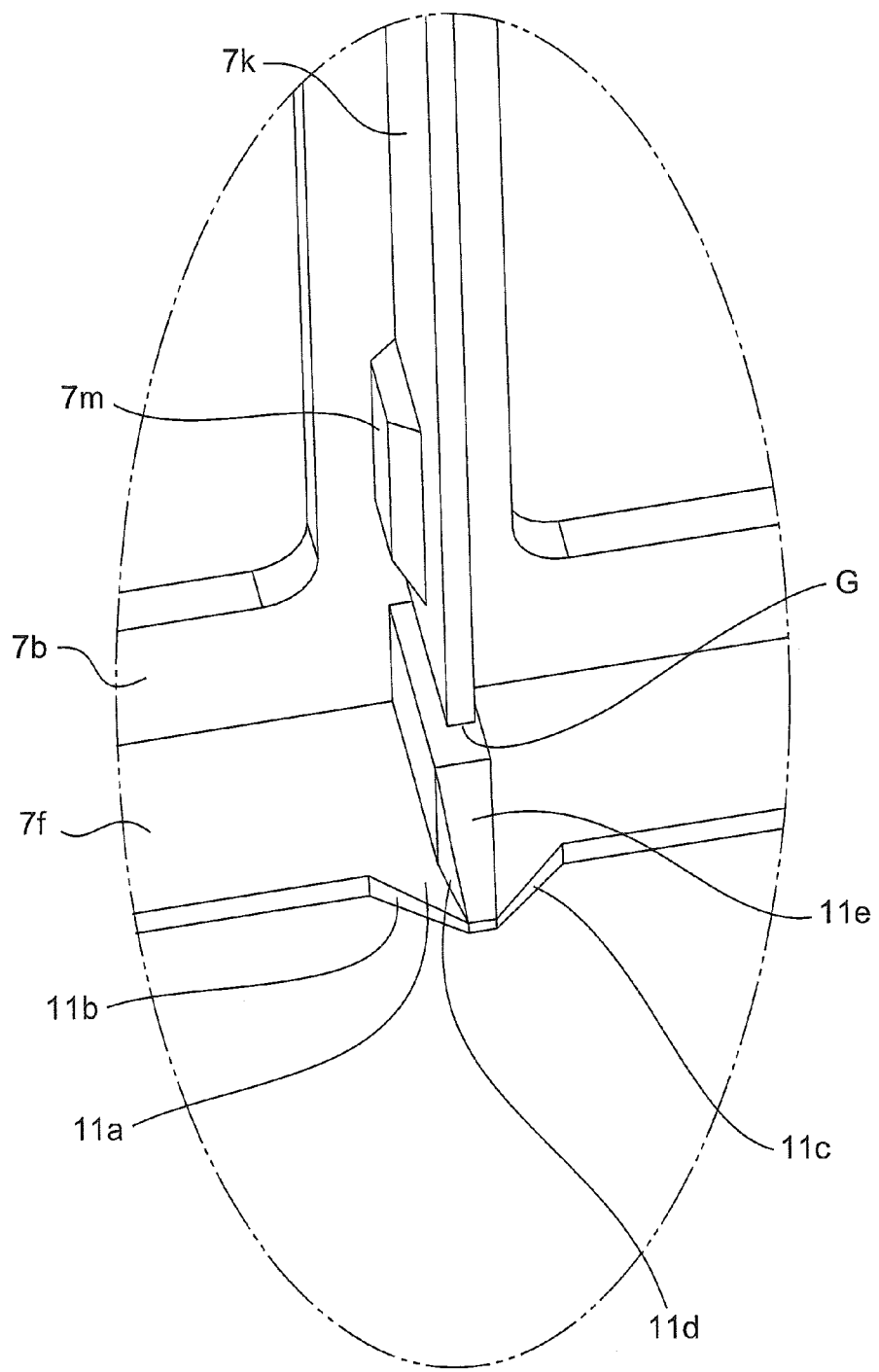
FIG. 8 is a perspective view of the first projection (without a pedestal) as viewed from below.
Figure 9:
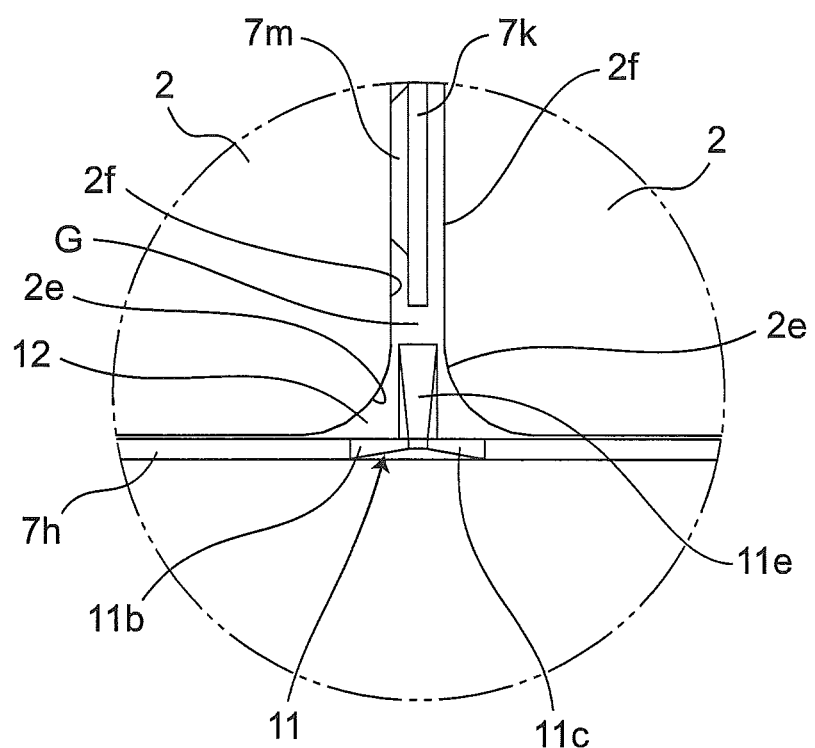
FIG. 9 is a bottom view of the first projection (without a pedestal)

As most clearly shown in FIGS. 7 and 9, the first projection 11 is provided so that a gap "G" is formed between the first triangular plate portion 11a and the partition rib 7k. As most clearly shown in FIGS. 6 and 8, the first projection 11 of the main rib 7g is provided at its most proximal end with a substantially trapezoidal columnar pedestal 11f, but the first projection 11 of the main rib 7f is not provided with a pedestal.

As most clearly shown in FIG. 5, angle portions 7n of the abutment member 7 are formed at connected portions between both ends of the main rib 7g and one ends of the main ribs 7h and 7i, and angle portions 7p are formed at connected portions between both ends of the main rib 7f and the partition rib 7k. The angle portions 7n and 7p are provided with second projections 14.

Figure 10:
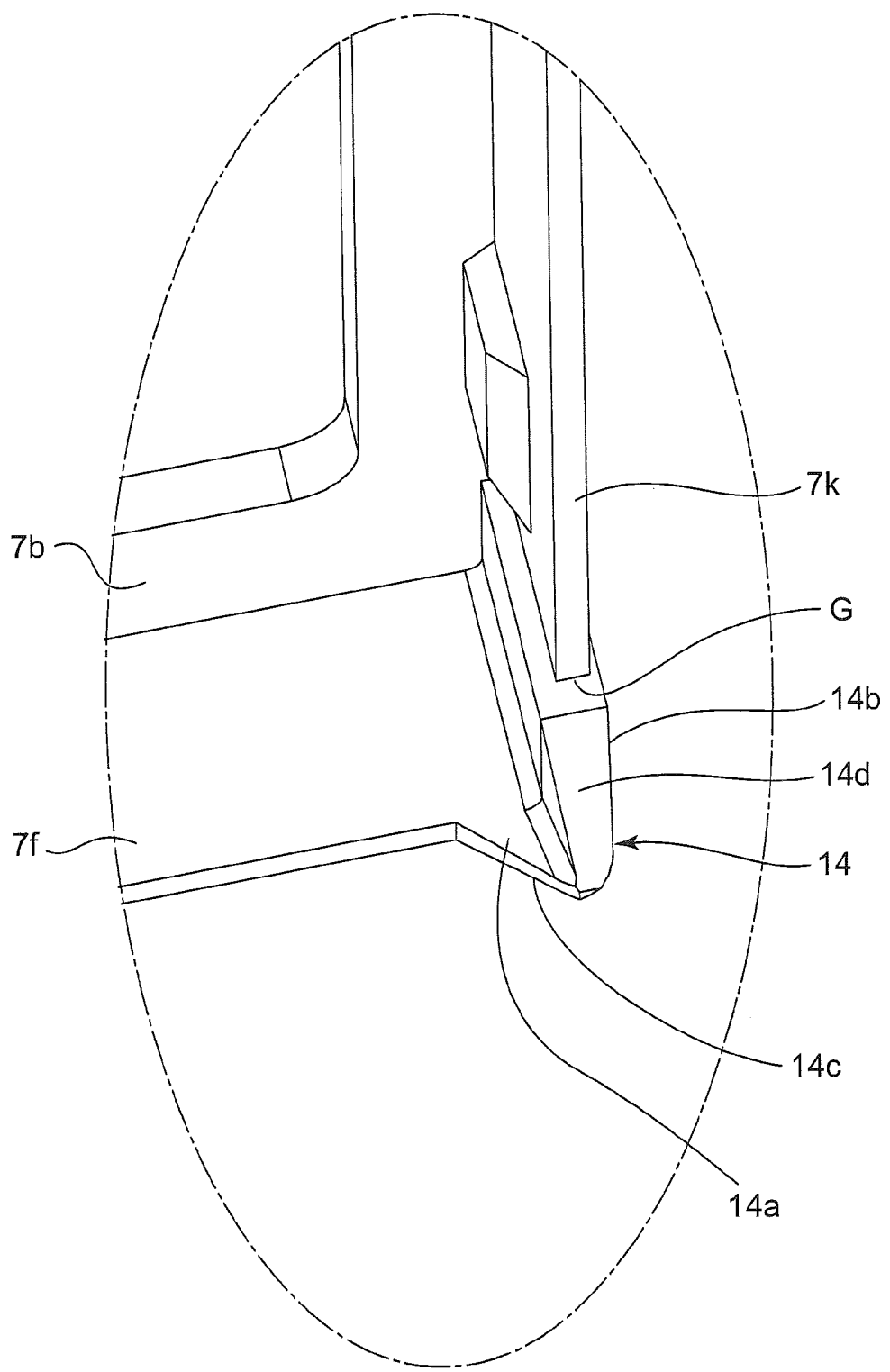
FIG. 10 is a perspective view of a second projection as viewed from below.
Figure 12:
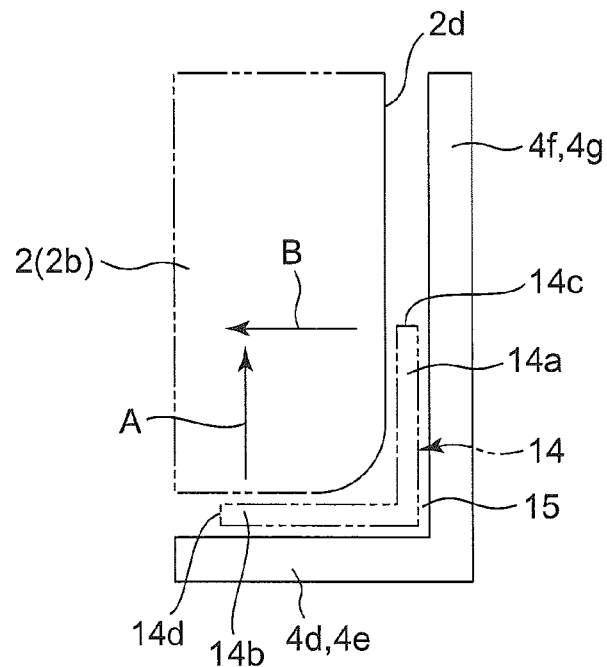
FIG. 12 is a schematic plan view of a second gap into which the second projection is inserted.

With reference to FIGS. 10 and 12, the second projections 14 project further downward from lower ends of the main ribs 7h and 7i. Each of the second projections 14 is inserted from above into a second gap 15 defined by the electric cells 2 and the angle portions 7n or 7p.

The second projection 14 includes first and second rectangular triangular plate portions 14a and 14b located substantially on the same planes with two wall portions configuring the angle portions 7n or 7p. Each of the first and second triangular plate portions 14a and 14b includes inclined surface 14c or 14d and has a shape which is tapered from its upper end toward its lower end.

Next, an attaching operation of the abutment member 7 to the case 4 will be described. This attaching operation may be carried out manually or by an automatic attaching apparatus.

The attaching operation of the abutment member 7 to the upper end opening 4a of the case 4 is carried out after all of the electric cells 2 (eight in this embodiment) are accommodated in the case 4 and the terminals 2c of the adjacent electric cells 2 are connected to each other via the bus bars 3. The abutment member 7 is put on the electric cells 2 in the case 4 from above so that the main ribs 7f to 7i of the abutment member 7 are inserted between the electric cells 2 and the sidewalls 4d to 4g of the case 4. The engaging projection 7j of the abutment member 7 is fitted into the engaging hole 4h of the case 4, and thereby the abutment member 7 is fixed to the case 4 and the attaching operation is completed. In the attaching operation-completed state, the body 7b of the abutment member 7 abuts against the top portions of the electric cells 2 accommodated in the case 4 so as to determine vertical positions of the electric cells 2. The terminals 2c of the electric cell 2 are exposed upward from the body 7b through the through holes 7c (see FIG. 2).

Even if the abutment member 7 descends toward the upper end opening 4a with positional deviation of the abutment member 7 to the upper end opening 4a of the case 4 as viewed from above, the insertion of the first and second projections 11 and 14 into the first and second gaps 12 and 15 aligns the abutment member 7 in position as viewed from above with respect to the upper end opening 4a. As a result, the main ribs 7f to 7i of the abutment member 7 are smoothly inserted between the case 4 and the electric cells 2. The lengths (projecting amount from abutment member 7b) of the first and second projections 11 and 14 are set longer than those of the main ribs 7f to 7i and the partition ribs 7k. Further, the first and second projections 11 and 14 are tapered. These configurations enable reliable and smooth insertion of the first and second projections 11 and 14 into the first and second gaps 12 and 15.

The gap "G" is provided between the first projection 11 and the partition rib 7k. Therefore, even if an external force is applied to the first projection 11 due to interference between the first projection 11 and the case 4 or the electric cell 2 when the abutment member 7 is attached, the gap "G" allows the first projection 11 itself to deform to some extent independently from the partition rib 7k. Especially, the first projection 11 relatively and easily deforms in a direction intersecting with the arraying direction of the electric cells 2, i.e., in the vertical direction in FIGS. 7 and 9. Therefore, providing the gap "G" can prevent the external force applied to the first projection 11 from being transmitted to other portions of the abutment member 7 through the partition rib 7k.

With reference to FIGS. 7 and 9, as viewed from the bottom (in an inserting direction of the first gap 12), each of the electric cells 2 is provided at its corners with arc portions 2e on the side of sidewall 7f or 7g and a straight portions 2f connected to the arc portions 2e and extending in a direction way from the sidewall 7f or 7g. The proximal end of the first projection 11 inserted into the first gap 12 is located closer to the sidewall 7f or 7g than connected portion between the arc portions 2e and the straight portion 2f. Such positional relation between the proximal end of the first projection 11 and the electric cell 2 allows the maximum width of the first projection 11, i.e., a distance between the first inclined surfaces 11b and 11c at the proximal end, to be set wide. This results in that the strength of the first projection 11 can be enhanced. By locating the maximum width portion of the first projection 11 closer to the sidewall 7f or 7g than the connected portions between the arc portion 2e and the straight portion 2f, it is not necessary to excessively and largely set a distance between the adjacent electric cells 2. The arc portion 2e may be of a curved shape not included in an arc shape and may be of a shape composed of a curve and a straight line.

With reference to FIG. 11, if a position of the abutment member 7 with respect to the upper end opening 4a of the case 4 as viewed from above is deviated inward of the case 4 as shown by an arrow A, the first inclined surfaces 11b and 11c of the first triangular plate portion 11a of the first projection 11 abut against an edge 2d (also see FIG. 3) which is composed of a connected portion between the body 7b and the battery cover 8 (also see FIG. 6). As the abutment member 7 descends toward the upper end opening 4a of the case 4, the first inclined surfaces 11b and 11c of the first projection 11 are guided by the edges 2d of the electric cells 2, and a position of the abutment member 7 with respect to the case 4 as viewed from above is displaced so that the positional deviation in the direction of the arrow A is resolved. By this lateral displacement of the abutment member 7, the first projection 11 is inserted into the first gap 12, the position of the abutment member 7 with respect to the case 4 as viewed from above is aligned, and the main ribs 7f to 7i of the abutment member 7 are smoothly inserted between the case 4 and the electric cells 2 without interfering with the electric cells 2 or the sidewalls 4d to 4g of the case 4. The partition ribs 7k of the abutment member 7 are inserted into the gaps between the adjacent electric cells 2.

If the position of the abutment member 7 with respect to the case 4 as viewed from above is deviated also in the arraying direction of the electric cells 2 shown by arrows B1 and B2 in addition to the positional deviation in the direction shown by the arrow A in FIG. 11, not only the first inclined surfaces 11b and 11c of the first triangular plate portion 11a of the first projection 11, but also the second inclined surface 11e of the second triangular plate portion 11d abut against the edge 2d of the electric cell 2. Due to that the first inclined surfaces 11b and 11c and the second inclined surface 11e are guided by the edge 2d of the electric cell 2, the position of the abutment member 7 with respect to the case 4 as viewed from above is displaced so that the positional deviations in the directions of the arrows A, B1, and B2 are resolved. By this displacement, the main ribs 7f to 7i of the abutment member 7 are smoothly inserted between the case 4 and the electric cells 2 without interfering with the electric cells 2 and the sidewalls 4d, 4e, 4f, and 4g of the case 4. The partition ribs 7k of the abutment member 7 are inserted into the gaps between the adjacent electric cells 2. The second triangular plate portion 11d including the second inclined surface 11e is provided on the extension line of the partition rib 7k as described above. Further the second inclined surface 11e is provided in addition to the first inclined surfaces 11b and 11c of the first triangular plate portion 11a. These arrangements enable the partition ribs 7k to be more smoothly inserted between the adjacent electric cells 2.

As described above, since the first projection 11 is provided, even if the position of the abutment member 7 with respect to the upper end opening 4a of the case 4 as viewed from above is deviated when the abutment member 7 is attached to the upper end opening 4a of the case 4, the first projection 11 is inserted into the first gap 12 so that the abutment member 7 is aligned in position with respect to the case 4. Therefore, the abutment member 7 is not necessary to be precisely aligned with respect to the upper end opening 4a of the case 4, enabling easy attachment of the abutment member 7. In other words, since the first projection 11 is guided by the edge 2d of the electric cell 2, the abutment member 7 can be smoothly attached to the case 4. As a result, the attaching operability of the abutment member 7 with respect to the case 4 is enhanced. Further, in case that the attaching operation of the abutment member 7 to the case 4 is carried out by the automatic attaching apparatus, the automatic attaching apparatus is not required to exert excessive aligning precision of the abutment member 7 with respect to the case 4.

With reference to FIG. 12, when the position of the abutment member 7 with respect to the upper end opening 4a of the case 4 as viewed from above is deviated in the direction shown by the arrow A, the inclined surface 14c of the first triangular plate portion 14a of the second projection 14 abuts against the edge 2d of the electric cell 2. Similarly, when the position of the abutment member 7 with respect to the upper end opening 4a of the case 4 as viewed from above is deviated in the direction shown by the arrow B, the inclined surface 14d of the second triangular plate portion 14b of the second projection 14 abuts against the edge 2d of the electric cell 2. The inclined surfaces 14c and 14d of the first and second triangular plate portions 14a and 14b are guided by the edge 2d of the electric cell 2. Therefore, as the abutment member 7 descends, the position of the abutment member 7 as viewed from above is displaced in the direction where the positional deviation is resolved. By this lateral displacement of the abutment member 7, the second projection 14 is inserted into the second gap 15, and thereby the position of the abutment member 7 with respect to the case 4 as viewed from above is aligned. Therefore, the main ribs 7f to 7i of the abutment member 7 are smoothly inserted between the case 4 and the electric cells 2 without interfering with the electric cells 2 or the sidewalls 4d to 4g of the case 4. The partition ribs 7k of the abutment member 7 are smoothly inserted into gaps between the adjacent electric cells 2. By providing the second projection 14 in addition to the first projection 11 in this manner, it is possible to more easily and smoothly attach the abutment member 7 to the upper end opening 4a of the case 4.

Figure 13A:
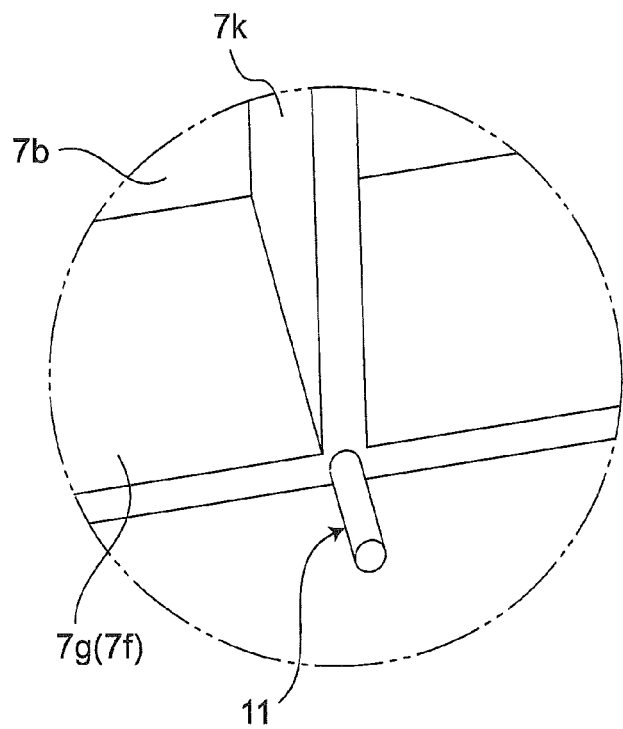
FIG. 13A is a perspective view showing a first modification of the first projection.
Figure 13B:
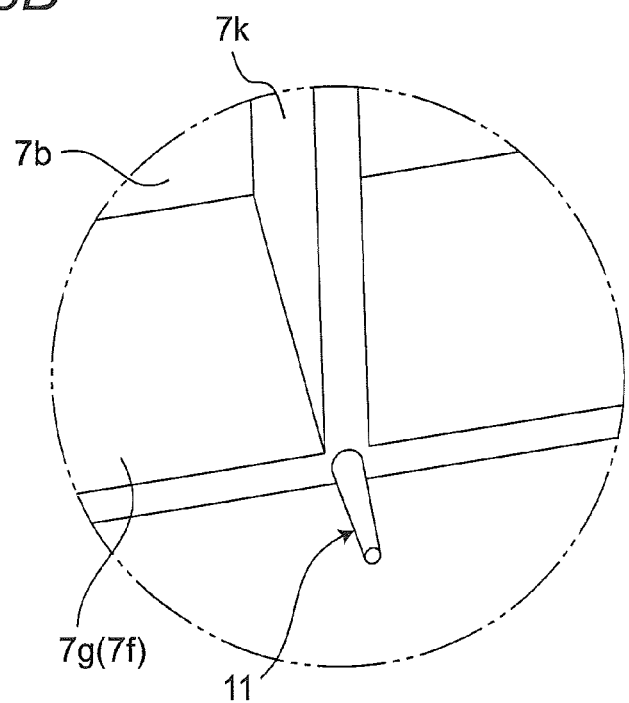
FIG. 13B is a perspective view showing a second modification of the first projection.
Figure 13C:
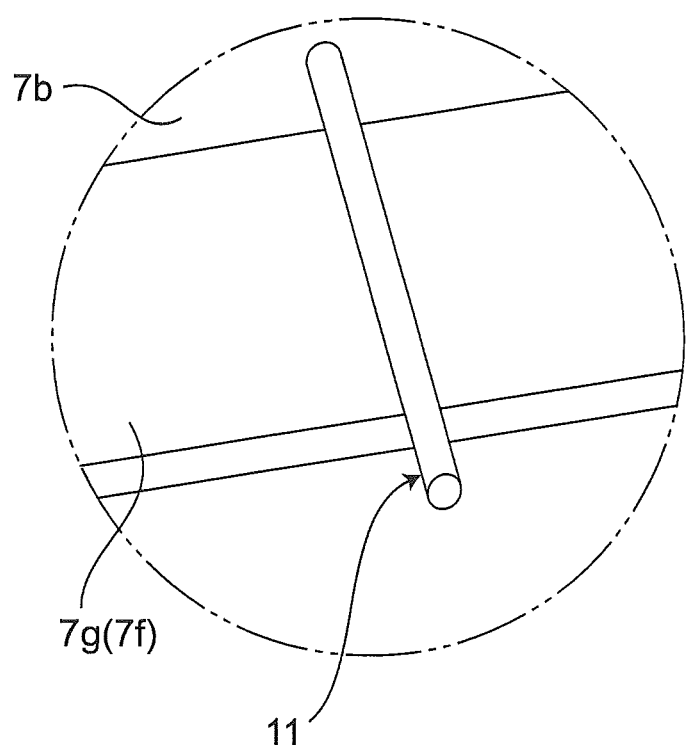
FIG. 13C is a perspective view showing a third modification of the first projection.

FIGS. 13A to 13C show modifications of the first projection 11. In the modification shown in FIG. 13A, a first projection 11 is a columnar member projecting from main ribs 7g and 7f. If the first projection 11 can be inserted into the first gap 12 (see FIG. 11) in this manner, it is not necessary that the first projection 11 is tapered. In the modification shown in FIG. 13B, a first projection 11 is a thin and long circular truncated cone projecting from main ribs 7g and 7f. In the modification shown in FIG. 13C, a first projection 11 is a thin and long circular truncated cone, and the first projection 11 projects not from the main ribs 7g and 7f but from a lower surface of a body 7b of an abutment member 7. If the first projection 11 can be inserted into the first gap 12 (see FIG. 11) in this manner, it is not always necessary that the first projection 11 is provided at the main rib 7g or 7f. The configurations as shown in FIGS. 13A to 13C can be applied to the second gap 15 also.

The present invention is not limited to the embodiment, and the invention can variously be modified. For example, positions of the electric cells 2 in the case 4 are held by the partition walls 4c of the case 4, the spacers 5 disposed between the electric cells 2, and the partition ribs 7k having the fixing ribs 7m. However, as long as the positions of electric cells 2 are reliably held, it is possible to employ such a configuration as that one or two of the partition walls 4c, the spacers 5, and the partition ribs 7k having the fixing ribs 7m are omitted.

What is claimed is:

1. An assembled battery, comprising:
  a case in which a plurality of electric cells are accommodated, each of the electric cells having a flat rectangular parallelepiped shape; and
  an abutment member which abuts against top portions of the electric cells accommodated in the case to position the electric cells with respect to the case,
  wherein the abutment member includes a projection inserted into a first gap defined by the case and mutually adjacent electric cells to align the abutment member, and
  wherein the projection is tapered from its proximal end toward its distal end.

2. The assembled battery according to claim 1, wherein the plurality of electric cells are arrayed in line so that long sides of the electric cells, as viewed from above, are opposed to each other.

3. The assembled battery according to claim 1, wherein the abutment member abuts against a surface of the electric cells from which a pair of terminals projects.

4. The assembled battery according to claim 1, wherein the abutment member includes a body which abuts against the electric cells and a rib which projects from the body so as to be inserted into the case.

5. The assembled battery according to claim 4, wherein a distance from the body to the distal end of the projection is longer than a distance from the body to a distal end of the rib.

6. The assembled battery according to claim 4, wherein a gap is provided between the projection and the rib.

7. The assembled battery according to claim 1, wherein, as viewed from a direction in which the projection is inserted, one of the electric cells is provided at its corner portion with an arc portion on a side of a sidewall of the case and a straight portion connected to the arc portion.

8. The assembled battery according to claim 7, wherein the proximal end of the projection inserted into the first gap is located closer to the sidewall than a connected portion between the arc portion and the straight portion.

9. The assembled battery according to claim 8, wherein said one of the electric cells extends in a direction away from the sidewall.

10. The assembled battery according to claim 1, wherein the case includes an angle portion formed on a connected portion between two sidewalls.

11. The assembled battery according to claim 10, wherein the abutment member includes another projection inserted between a second gap defined by the angle portion and the electric cells so that the abutment member is aligned with respect to an opening of the case.

12. An assembled battery, comprising:
  a case in which a plurality of electric cells are accommodated; and
  an abutment member which abuts against the electric cells accommodated in the case to position the electric cells with respect to the case,
  wherein the abutment member includes a projection inserted into a first gap defined by the case and mutually adjacent electric cells to align the abutment member,
  wherein the abutment member includes a body which abuts against the electric cells and a rib which projects from the body so as to be inserted into the case, and
  wherein a length from the body to a distal end of the projection is longer than a length from the body to a distal end of the rib.

13. The assembled battery according to claim 12, wherein a gap is provided between the projection and the rib.

14. The assembled battery according to claim 12, wherein the case includes a sidewall which surrounds the plurality of electric cells,
  wherein the rib includes a main rib which projects from the body so as to be inserted between the electric cells and the sidewall, and
  wherein the projection projects from a distal end of the main rib.

15. The assembled battery according to claim 14, wherein the projection includes a pair of first inclined surfaces, a distance between the first inclined surfaces in an arraying direction of the mutually adjacent electric cells being gradually reduced from a proximal end toward the distal end.

16. The assembled battery according to claim 15, wherein, as viewed from a direction in which the projection is inserted, one of the electric cells is provided at its corner portion with an arc portion on a side of the sidewall and a straight portion connected to the arc portion and extending in a direction away from the sidewall, and
  wherein the proximal end of the projection inserted into the first gap is located closer to the sidewall than a connected portion between the arc portion and the straight portion.

17. The assembled battery according to claim 15, wherein the rib includes a partition rib inserted between the mutually adjacent electric cells, and
  wherein the projection is provided at a position of the main rib corresponding to an end of the partition rib.

18. The assembled battery according to claim 17, wherein the projection includes a second inclined surface which is provided on an extension line of the partition rib and gradually approaches the main rib from the proximal end toward the distal end.

19. An assembled battery, comprising:
  a case in which a plurality of electric cells are accommodated; and
  an abutment member which abuts against the electric cells accommodated in the case to position the electric cells with respect to the case,
  wherein the abutment member includes a first projection inserted into a first gap defined by the case and mutually adjacent electric cells to align the abutment member,
  wherein the case includes an angle portion formed on a connected portion between two sidewalls, and
  wherein the abutment member includes a second projection inserted between a second gap defined by the angle portion and the electric cells so that the abutment member is aligned with respect to an opening of the case.

* * * * *